United States Patent [19]

Hayashi et al.

[11] 4,069,060

[45] Jan. 17, 1978

[54] ALUMINA-SILICON CARBIDE REFRACTORIES AND THEIR METHOD OF MANUFACTURE

[75] Inventors: Takeshi Hayashi, Bizen; Masao Shibuno, Okayama, both of Japan

[73] Assignee: Shinagawa Refractories Co., Ltd., Tokyo, Japan

[21] Appl. No.: 615,094

[22] Filed: Sept. 19, 1975

[30] Foreign Application Priority Data

Oct. 7, 1974 Japan .................................. 49-114731

[51] Int. Cl.² .................... C04B 35/02; C04B 35/52; C04B 35/00; F37B 9/04
[52] U.S. Cl. ..................................... 106/65; 106/44; 106/73.4; 106/73.5; 264/65; 264/82
[58] Field of Search ................ 106/65, 44, 73.4, 73.5; 264/65, 82, DIG. 36

[56] References Cited

U.S. PATENT DOCUMENTS

| | | | |
|---|---|---|---|
| 2,979,414 | 4/1961 | Ryshkewitch et al. | 106/65 |
| 3,007,805 | 11/1961 | Cline | 106/44 |
| 3,230,100 | 1/1966 | Davies et al. | 106/44 |
| 3,261,696 | 7/1966 | Wiegert et al. | 106/65 |
| 3,342,615 | 9/1967 | Miller | 106/44 |
| 3,671,275 | 6/1972 | Gates et al. | 106/65 X |
| 3,753,744 | 8/1973 | Komaru et al. | 106/65 |
| 3,759,725 | 9/1973 | Steen | 106/44 |
| 3,892,584 | 7/1975 | Takeda et al. | 106/44 X |

*Primary Examiner*—J. Poer
*Assistant Examiner*—William G. Wright
*Attorney, Agent, or Firm*—Birch, Stewart, Kolasch and Birch

[57] ABSTRACT

Alumina-silicon carbide refractory characterized by comprising predominantly an inter growth texture. The alumina-silicon carbide is manufactured by adding fine aluminum powder to a body of silica-alumina type refractory compound, mixing, molding and drying the resultant mixture to obtain a green body and finally firing the green body in an atmosphere containing predominantly a carbon oxide gas.

13 Claims, No Drawings

ALUMINA-SILICON CARBIDE REFRACTORIES AND THEIR METHOD OF MANUFACTURE

The present invention relates to new alumina-silicon carbide refractories and their method of manufacture.

As is well known, a prior alumina-silicon carbide refractory has been manufactured by a process which comprises using alumina raw material and silicon carbide raw material as a starting material, respectively crushing these materials to form grains and powders, grading these grains and powders, mixing these graded grains and powders, adding a bonding clay, mixing, molding and drying the mixture to a green body and finally firing the green body.

In such prior process, it is necessary to previously prepare a high grade silicon carbide and alumina separately, and the microstructure of the alumina-silicon carbide refractory material obtained by such prior process is not a united uniform structure of generally large crystal particles which are independent. Moreover, pores and gaps are present among the boundaries of the crystal particles and consequently the binding strength is decreased; also a porous structure which is easily subjected to corrosion due to permeating components coming from the outside is present. There are also the disadvantages that a glassy substance is readily formed at the fine powder bonding portions, the hot strength is decreased and the thermal conductivity is comparatively low.

On the other hand, generally the prior fire-clay refractory contains free silica present as a cristobalite crystal phase, and it is vitrified at a high temperature and as a result there are the disadvantages that the strength of the refractory is weakened and cracking occurs due to its extraordinary expansion.

The object of the present invention is to provide new alumina-silicon carbide refractories comprising predominantly an inter growth texture of corundum and silicon carbide.

A further object of the present invention is to provide a process for manufacturing the above new alumina-silicon carbide refractories using a silica-alumina refractory compound and fine aluminum powder as the starting material.

As a result of various investigations for improving the above-mentioned disadvantages of the prior art relating to alumina-silicon carbide refractories, we have now found that the new alumina-silicon carbide refractories comprising predominantly an inter growth texture of corundum and silicon carbide can be obtained by adding fine aluminum powder to a body of silica-alumina type refractory compound, mixing, molding and drying the resultant mixture to obtain a green body and finally firing the green body in an atmosphere containing a carbon oxide gas such as carbon monoxide and carbon dioxide gases.

Therefore, the present invention is directed to new alumina-silicon carbide refractories characterized by comprising predominantly an inter growth texture of corundum and silicon carbide.

The new alumina-silicon carbide refractories of the present invention contain preferably 52 to 98% by weight, more preferably 60 to 98% by weight of the inter growth texture of corundum and silicon carbide.

The inter growth texture in the new alumina-silicon carbide refractories of the present invention consists of preferably 50 to 98% by weight of corundum and 2 to 35% by weight of silicon carbide.

Also, the present invention is directed to a process for manufacturing alumina-silicon carbide refractories comprising predominantly an inter growth texture of corundum and silicon carbide which comprises adding fine aluminum powder to a body of a silica-alumina type refractory compound, mixing, molding and drying the resultant mixture to obtain a green body and finally firing the green body in an atmosphere containing predominantly a carbon oxide gas.

The characteristics of the present invention are explained in detail below.

The first characteristic of the present invention consists in the fact that the starting material which is used as a base of alumina-silicon carbide is predominantly a silica-alumina refractory compound and fine aluminum powder. Most generally, a refractory clay is used as the starting material of a silica-alumina refractory. As examples of the silica-alumina type refractory compound which may be used in the present invention, there are mentioned fused silica, volatilized silica, Roseki (agalmatolite), bentonite clay, ball clay, frint clay, washed clay, mullite, sillimanite, kyanite, bauxite and the schamottes. This kind of starting material includes various types from $SiO_2$ rich silicious materials to $Al_2O_3$ rich aluminous materials which can all be used in the present invention. This is possible by carrying out a generally suitable grading thereof. When fine aluminum powder is used therewith, alumina-silicon carbide type refractories can be used without the requirement of respectively using a high grade of silicon carbide and alumina as are used in the prior art.

On the other hand, the particle size of the fine aluminum powder is preferred to be smaller for an increasing of the reactive surface area and uniform dispersion of the fine aluminum powder into a body of refractory.

As a result of various experiments the size of the fine aluminum powder is substantially satisfactory when it is less than 48 mesh (Tyler) and the most suitable particle size is wholly passed through a 100 mesh sieve (Tyler) and contains at least 60% by weight of less than 325 mesh (Tyler). The function and effect of the fine aluminum powder is to deoxidize $SiO_2$ in the silica-alumina type refractory and simultaneously carbon monoxide (CO) or carbon dioxide ($CO_2$) and as a result the carbonization reaction of the formed silicon is accelerated.

The effective mixing quantity of the fine aluminum powder into the body of silica-alumina type refractory is preferably in a range of 5 to 55% by weight and a most preferable mixing quantity is in the range of 10 to 40% by weight. When the mixing quantity of the fine aluminum powder is more than 55% by weight the plasticity of the green body is decreased and consequently the handling thereof is easily subject to problems and also the excess of aluminum metal in the fired refractory is increased whereby its fusion transformation is optionally affected depending upon the temperature of use and the atmosphere.

The second characteristic of the present invention is to be able to carry out in a satisfactory condition a deoxidation or oxidation of the fine aluminum powder in the green body by regulating the firing atmosphere. From the result of discovery the fact that the oxidation based upon a heating of the fine aluminum powder which is added into said green body is generally effected only on the surface portion in a firing atmosphere but the oxidation can not be effected in the center of the aluminum powder, we continued a further investigation that the oxidation can also be attained to the center of the fine aluminum powder and discovered that when the heating is carried out in an atmosphere of carbon monoxide (CO) or carbon dioxide ($CO_2$) or a mixture of carbon monoxide and carbon dioxide at a temperature of more than 1,000° C, the fine aluminum powder in the center of the green body is also easily oxidized by reacting it with $SiO_2$ in the refractory body and $O_2$ in the atmospheric gas. In this case, even if an inert gas such as nitrogen and argon in the atmosphere is more or less included in the atmosphere gas, the present invention is not adversely affected. Furthermore, the effective heating temperature is varied by the variation of the composition but particularly the temperature is not restricted. When the heating temperature is less than 1,000° C, the reaction can be carried out over a long period of time and on the other hand when the heating temperature is high the reaction can be completed in a short time.

In order to completely carry out the deoxidation or oxidation of the fine aluminum powder in the green body, it has been found that it is necessary to remarkably decrease the oxygen partial pressure by regulating the firing atmosphere.

It is generally well known that a fire clay containing kaolinite ($Al_2O_3.2SiO_2.2H_2O$) as a main component is fired to form mullite ($3Al_2O_3.2SiO_2$) and crystobalite ($SiO_2$). It is considered that the deoxidation or oxidation of fine aluminum powder in the present invention proceeds to form silicon carbide (SiC) and alumina ($Al_2O_3$) by the following formulae:

$$3Al_2O_3.2SiO_2 + 4Al + 2CO \rightarrow 5Al_2O_3 + 2SiC$$

$$3(3Al_2O_3 + 2SiO_2) + 16Al + 6CO_2 \rightarrow 17Al_2O_3 + 6SiC$$

$$SiO_2 + 2Al + CO \rightarrow SiC + Al_2O_3$$

$$3SiO_2 + 8Al + 3CO_2 \rightarrow 3SiC + 4Al_2O_3$$

As example of a concrete means for regulating the atmosphere, furthermore, the direct use of the above-mentioned gases is preferable, but the object can be comparatively easily attained by using a fine carbon powder. Namely, the green body is placed in a saggar, for example made of a high aluminous material, and fine carbon powders are loosely filled around the green body to co-exist together with air, and then a firing is preferably carried out at a definite temperature by covering the saggar with a lid made of the same material as that of the saggar and then adhering it loosely with a refractory mortar.

The third characteristic of the present invention is to obtain a high quality of refractory material having a very high additional value comprising predominantly corundum and silicon carbide from a silica-alumina type refractory such as raw fire clay material and fine aluminum powder. The economical effect is very significant because a refractory having a high quality is manufactured from a low grade and cheap raw material without the use of an expensive silicon carbide and aluminous material, thereby effecting a saving of energy and material resources.

The fourth characteristic of the present invention is the fact that the refractory of the present invention is composed from a strong bonding structure of corundum and silicon carbide and has a very superior hot strength, corrosion resistance and thermal conductivity. Further- more, there are the advantages that the refractory of the present invention has a considerably good stability because a film of silicon oxide is formed on the surface of the silicon carbide and an oxidation in the inner part of the silicon carbide is inhibited even if a heating is carried out in an oxidizing atmosphere, and that the textural change of the refractory of the present invention is substantially the same as the textural change due to the oxidation of for example other carbides and carbon.

As described above, the refractory of the present invention has advantages that the structure is different from the prior refractory which is manufactured by grading and composing the prior raw materials, corundum and silicon carbide, independently and that the hot strength thereof is high.

In the refractory of the present invention, namely, silica ($SiO_2$) in the composition of mullite is deoxidized and carbonized uniformly to form silicon carbide of an ultra fine particle, and simultaneously by the remaining alumina in the ultra fine particle is very uniformly and intimately dispersed and distributed between these silicon carbide particles to form a strong inter growth texture. Further, alumina ($Al_2O_3$) particles which are formed by the oxidation of the mixed fine aluminum powders are uniformly distributed in the portion of the fine bonding structure to accelerate the formation of a stronger inter growth texture. Consequently, the refractory of the present invention has a considerably high hot strength and creep resistance and the increases of corrosion resistance and thermal conductivity are remarkably higher than that of the refractory of the prior art.

In the present invention, furthermore, the cristobalite which is harmful for the prior fire clay brick as described in the preceding is converted to silicon carbide to give a remarkably superior thermal property so that the resultant effect is truly high.

The present invention is illustrated by the following examples.

EXAMPLES 1 to 3

A cylinder having the size of 50 mm diameter and 50 mm height was formed using a metal mold under a forming pressure of 500 Kg/cm² from a soft mud of a body of fire-clay refractory and a fine aluminum powder and which has a composition as described in the following Table 1, and then the formed cylinder was dried at the temperature of 105° C for 10 hours. After the above drying, the green body was charged in a muffle furnace and a minor amount of charcoal was placed in the surroundings of the green body and then the green body was fired at the temperature of 1,400° C for 5 hours while passing $CO_2$ gas therethrough. The temperature elevating rate and the cooling rate were respectively 300° C/hr. and 100° C/hr. $CO_2$ gas was still passed through the muffle furnace from the time of temperature elevation to the cooling.

Table 1

| Raw materials | Particle size | Examples 1 | Examples 2 | Examples 3 | Comparative Examples 1 | Comparative Examples 2 | Comparative Examples 3 |
|---|---|---|---|---|---|---|---|
| A chamotte | 2.8~1.0 mm | 29 | 24 | 18 | 30 | 25 | 20 |
| A chamotte | less than 0.7 mm | 10 | 8 | 6 | 10 | 15 | 15 |
| A chamotte | less than 0.3 mm | 12 | 10 | 8 | 13 | 10 | 5 |
| B chamotte | 2.8 1.0 mm | 14 | 12 | 9 | 15 | 15 | 15 |
| B chamotte | less than 0.7 mm | 19 | 16 | 12 | 20 | 5 | 5 |
| Fire clay | less than 0.7 mm | 11 | 10 | 7 | 12 | 10 | 10 |
| Silicon carbide | less than 0.3 mm | — | — | — | — | 20 | 30 |

Table 1-continued

| Raw materials | Particle size | Examples 1 | 2 | 3 | % by weight Comparative Examples 1 | 2 | 3 |
|---|---|---|---|---|---|---|---|
| Aluminum | less than 0.061 mm | 5 | 20 | 40 | — | — | — |

For the sake of comparison, there are also mentioned compositions which did not include the fine aluminum powder in Table 1.

The characteristics of the refractory which are obtained after the firing are shown in Table 2.

Table 2

| | Examples | | | Comparative Examples | | |
|---|---|---|---|---|---|---|
| Mineral composition | 1 Corundum Silicon carbide | 2 Corundum Silicon carbide | 3 Corundum Silicon carbide Aluminum | 1 Mullite Cristo-balite | 2 Mullite Cristo-balite Silicon carbide | 3 Mullite Cristo-balite Silicon carbide |
| Apparent porosity (%) *1 | 22.4 | 22.1 | 16.7 | 23.5 | 23.4 | 23.6 |
| Bulk density *1 | 2.17 | 2.30 | 2.26 | 2.10 | 2.00 | 2.06 |
| Apparent specific gravity *1 | 2.80 | 2.95 | 2.71 | 2.75 | 2.61 | 2.69 |
| Refractoriness under load ($T_2$° C) *2 | >1750 | >1800 | >1800 | 1543 | 1510 | 1512 |
| Thermal conductivity *3 (Kcal/m.h.° C) at 1,000° C | 5.4 | 9.7 | 15.8 | 1.67 | 1.63 | 1.73 |
| Corrosion resistance (Corrosion area cm$^2$) *4 | 1.3 | 0.9 | 0.5 | 3.5 | 7.3 | 5.5 |

*1 Measured by Japanese Industrial Standard (JIS-R2205)
*2 Measured by Japanese Industrial Standard (JIS-R2209)
*3 Measured by similar method to ASTM-C201
*4 Measured by Japanese industrial Standard (JIS-R2214) (Blast furnace slag 50g, 1,500° C, 2 hr.)

From Table 2, it is recognized that the refractory property under load of the present product shows a significant increase of more than 200° C in comparison with the product which is obtained without the addition of fine aluminum powder, and the creep resistance and hot strength thereof are remarkably increased. It is also clearly recognized that the thermal conductivity and corrosion resistance are increased.

EXAMPLES 4 TO 6

Fine aluminum powder was added into a body of clay bonded aluminous refractory to form a soft mud having a composition as described in the following Table 3. The obtained soft muds were respectively formed by using a metal mold under the forming pressure of 500 Kg/cm$^2$ to obtain a cylinder having the size of 50 mm diameter and 50 mm height. After these cylinders were dried at the temperature of 105° C for 10 hours, the obtained green body was charged in a saggar made of a high alumina refractory and a breeze powder was loosely filled in the upper and lower parts and surroundings of the green body and in the presence of air. The saggar was loosely covered with a lid made of the same material as the material of the saggar by using a mortar and a firing was carried out in a heavy oil furnace at the temperature of 1,600° C for 5 hours. The temperature elevating rate and the cooling rate were respectively 300° C/hr. and 100° C/hr.

Table 3

| Raw materials | Particle Size | Examples 4 | 5 | 6 | Comparative Examples 4 | 5 | 6 |
|---|---|---|---|---|---|---|---|
| Fused alumina | 2.8 ~1.0 mm | 38 | 32 | 20 | 40 | 35 | 35 |
| Fused alumina | less than 0.3 mm | 38 | 32 | 20 | 40 | 30 | 28 |
| Calcined alumina | less than 0.3 mm | 10 | 8 | 5 | 10 | 20 | 20 |
| Fire clay | less than 0.7 mm | 9 | 8 | 5 | 10 | 10 | 7 |
| Silicon carbide | less than 0.3 mm | — | — | — | — | 5 | 10 |
| Aluminum | less than 0.061 mm | 5 | 20 | 50 | — | — | — |

For the sake of comparison, there are also mentioned compositions which did not include fine aluminum powder in Table 3.

The characteristics of the refractories which are obtained after the firing are as shown in Table 4; it is recognized that various characteristics such as hot strength and thermal conductivity are considerably superior than the prior products.

Table 4

| | Examples | | | Comparative Examples | | |
|---|---|---|---|---|---|---|
| Mineral composition | 4 Corundum Silicon carbide | 5 Corundum Silicon carbide | 6 Corundum Silicon carbide Aluminum | 4 Corundum Mullite | 5 Corundum Mullite Silicon carbide | 6 Corundum Mullite Silicon carbide |
| Apparent porosity (%) *1 | 28.7 | 19.5 | 15.0 | 26.4 | 27.1 | 27.5 |
| Bulk density *1 | 2.75 | 2.76 | 2.60 | 2.68 | 2.65 | 2.62 |
| Apparent specific gravity *1 | 3.87 | 3.42 | 3.09 | 3.65 | 3.63 | 3.61 |
| Refractoriness under load ($T_2$° C) *2 | >1800 | >1800 | >1800 | 1710 | 1530 | 1580 |
| Thermal conductivity *3 (Kcal/m.h.° C) at 1,000° C | 7.1 | 11.2 | 17.9 | 2.3 | 2.8 | 3.2 |
| Corrosion resistance (corrosion area cm$^2$) *4 | 0.2 | 0.1 | 0 | 2.7 | 3.1 | 2.6 |

*1 Measured by Japanese Industrial Standard (JIS-R2205)
*2 Measured by Japanese Industrial Standard (JIS-R2209)
*3 Measured by similar method to ASTM-C201
*4 Measured by Japanese Industrial Standard (JIS-R2214) (Blast furnace slag 50g, 1,500° C, 2 hr.)

What we claim is:

1. A process for manufacturing alumina-silicon carbide type refractories having a bonding structure which comprises mixing a silica-alumina type refractory material with a metallic aluminum powder, molding the mixture, drying the molded mixture, and then firing it in an atmosphere containing predominantly a carbon oxide gas, whereby the silica contained in the silica-alumina refractory material is reduced with the metallic aluminum powder to form metallic silicon and simultaneously corundum and also said metallic silicon is carbonized with the carbon oxide gas to form silicon carbide, so that an inter growth texture comprising corundum and silicon carbide is formed in a portion of the bonding structure of the refractories.

2. A process as claimed in claim 1, wherein the alumina-silicon carbide refractories contain 52 to 98% by weight of the inter growth texture of corundum and silicon carbide.

3. A process as claimed in claim 1, wherein the alumina-silicon carbide refractories contain 60 to 98% by weight of the inter growth texture of corundum and silicon carbide.

4. A process as claimed in claim 1, wherein the inter growth texture consists of 50 to 98% by weight of corundum and 2 to 35% by weight of silicon carbide.

5. A process as claimed in claim 1, wherein the silica-alumina type refractory material is fused silica, volatilized silica, agalmatolite, bentonite, ball clay, frint clay, washed clay, mullite, sillimanite, kyanite, bauxite or schamottes.

6. A process as claimed in claim 1, wherein the particle size of the metallic aluminum powder is less than 48 mesh (Tyler).

7. A process as claimed in claim 1, wherein the addition quantity of the metallic aluminum powder is 5 to 55% by weight.

8. A process as claimed in claim 1, wherein the addition quantity of the metallic aluminum powder is 10 to 40% by weight.

9. A process as claimed in claim 1, wherein the firing atmosphere contains predominantly carbon monoxide gas and almost no oxygen.

10. A process as claimed in claim 1, wherein the firing atmosphere contains predominantly carbon dioxide gas and almost no oxygen.

11. A process as claimed in claim 1, wherein the firing atmosphere contains predominantly a mixture of carbon monoxide gas and carbon dioxide gas and almost no oxygen.

12. A process as claimed in claim 1, wherein the firing is carried out at a temperature of 1000° to 1800° C. for more than 1 hour.

13. An alumina-silicon carbide type refractory prepared by a process as claimed in claim 1.

* * * * *